United States Patent [19]

Ogura et al.

[11] Patent Number: 5,320,063
[45] Date of Patent: Jun. 14, 1994

[54] LUMINOUS POINTER

[75] Inventors: Hiroyuki Ogura; Masaya Sugita; Takahiro Oikawa, all of Shizuoka, Japan

[73] Assignee: Yazaki Corporation, Tokyo, Japan

[21] Appl. No.: 35,308

[22] Filed: Mar. 22, 1993

[30] Foreign Application Priority Data

Jan. 31, 1992 [JP] Japan .................................. 4-3406

[51] Int. Cl.⁵ .......................................... G01D 13/22
[52] U.S. Cl. ................................. 116/288; 116/328
[58] Field of Search ............ 116/286, 287, 288, 327, 116/328, DIG. 35; 368/226, 228, 238

[56] References Cited

U.S. PATENT DOCUMENTS

| | | | |
|---|---|---|---|
| 2,824,992 | 2/1958 | Bouchard et al. | 116/DIG. 35 X |
| 2,964,666 | 12/1960 | Klasens et al. | 116/DIG. 35 X |
| 3,066,643 | 12/1962 | Flanagan, Jr. | 116/288 X |
| 3,071,105 | 1/1963 | Wertheimer | 116/286 |
| 3,094,970 | 6/1963 | Zargarpur | 116/286 |
| 3,103,607 | 9/1963 | Rulon | 116/DIG. 35 X |
| 3,219,008 | 11/1965 | Harris et al. | 116/286 |
| 5,050,045 | 9/1991 | Kato et al. | 116/288 X |

FOREIGN PATENT DOCUMENTS 389487 4/1991 Japan .

*Primary Examiner*—William A. Cuchlinski, Jr.
*Assistant Examiner*—W. Morris Worth
*Attorney, Agent, or Firm*—Sughrue, Mion, Zinn, Macpeak & Seas

[57] ABSTRACT

Disclosure is a luminous pointer made of a light emission element of the inorganic substance dispersion type, high in accuracy of reading, and low in cost. The light emission element of the inorganic substance dispersion type is shaped as a rod, and includes a linear metal core, an electrically-insulating reflective layer made of an enamel and disposed on the core, a fluorescent light emission layer which is made of an enamel and a fluorescent substance dispersed therein and is disposed on the reflective layer, an electroconductive film disposed on the light emission layer and capable of being electrically connected to the core, and an outer electrically-insulating layer disposed on the film. The film has at least one slit which has a width smaller than the diameter of the luminous pointer and extends as a luminously visible portion in the longitudinal direction of the film. An intermediate electrically-insulating layer made of an enamel may be provided between the light emission layer and the film. The film is manufactured by applying an electroconductive paste or plating with a metal. In the light emission layer, the dispersed fluorescent substance may be provided only near the slit of the film.

8 Claims, 2 Drawing Sheets

LUMINOUS POINTER

BACKGROUND OF THE INVENTION

The present device relates to a luminous pointer made of a light emission element which is of the organic substance dispersion type which can be accurately read and which is low in cost.

A light emission element of the inorganic substance dispersion type has been widely used for the measuring instrument of a motor vehicle, a show window or the like.

A conventional flat such element has the basic construction as shown in FIG. 7. The element includes a metal plate base 1, an electrically-insulating reflective layer 2 made of a vitreous enamel and disposed on the base, a fluorescent light emission layer 3 disposed on the reflective layer, a transparent electroconductive film 4 disposed on the light emission layer, and a transparent protective layer 5 disposed on the film. The reflective layer 2 is made of the vitreous enamel which is high in dielectric constant to increase an electrical field to be applied to the light emission layer 3 and is white in color for reflective purposes. The light emission layer 3 is made of an enamel and, a fluorescent substance dispersed therein. The film 4 is an ITO film indium-tin oxide or, more specifically, tin doped indium oxide or the like, and is formed on the light emission layer 3 by evaporative deposition, sputtering or the like. The transparent protective layer 5 constitutes the surface of the element, electrically insulates it from the outside, and protects the element. The element also includes an electrode 1a disposed on the metal plate base 1, and an electrode 4a disposed on the film 4. When a voltage is applied from a power supply 7 to the electrodes 1a and 4a through wires 6, the electric field is generated in the light emission layer 3 so that the fluorescent substance emits light. The flat element has been widely used for the dial of the measuring instrument of a motor vehicle or the like.

An art of manufacturing a luminous pointer which itself emits light and has the same light emitting function as the conventional light emission element is conceivable, but people have been hesitant to put the art into practical use, because of problems described from now on., Although the diameter of the pointer needs to be very small to enable accurate reading, it is difficult from viewpoints of material and processing to manufacture a light emission element which is of the inorganic substance dispersion type and is shaped as a pointer of 1.0 mm or less in diameter. This is one of the problems. Since the element includes an expensive ITO film as a transparent electroconductive film, the element is high in cost. This is another problem.

SUMMARY OF THE INVENTION

The present invention is designed to solve the above-mentioned problems. Accordingly, it is an object of the device to provide a luminous pointer made of a light emission element which is of the inorganic substance dispersion type can be accurately read and is low in cost.

The luminous pointer is characterized by being made of the light emission element which is of the inorganic substance dispersion type and includes a linear metal core, an electrically-insulating reflective layer made of an enamel and disposed on the core, a fluorescent light emission layer which is made of an enamel and a fluorescent substance dispersed therein and is disposed on the reflective layer, an electroconductive film disposed on the light emission layer, and an outer electrically-insulating layer disposed on the film. The film has at least one slit which has a width smaller than the diameter of the pointer and extends as a luminously visible portion in the longitudinal direction of the film.

Since the luminous pointer provided in accordance with the present device is read at the slit extending as a luminously visible portion in the electroconductive film of the light emission element of the inorganic substance dispersion type in the longitudinal direction of the film and having the width smaller than the diameter of the pointer, the accuracy of the reading is high. The film does not need to be an expensive ITO film, but can be manufactured by applying an electroconductive paste or plating with a metal, to diminish the cost of the pointer. Thus, the pointer can be made high in accuracy of reading and low in cost, in order to be widely used for the measuring instrument of a motor vehicle, another type of measuring instrument or the like.

DETAILED DESCRIPTION OF THE PREFERRED EMBODIMENTS

Embodiments of the present device are hereafter described in detail with reference to the drawings attached hereto.

Figure 1:
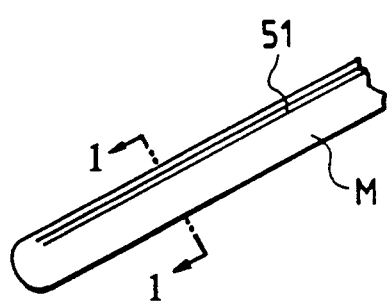
FIG. 1 is a perspective view of a luminous pointer which is an embodiment of the present device.
Figure 2:
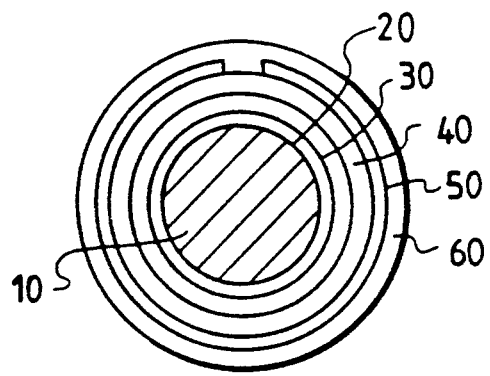
FIG. 2 is a sectional view of the pointer along lines 1—1 shown in FIG. 1.

FIG. 1 is a perspective view of a luminous pointer which is one of the embodiments. FIG. 2 is a sectional view of the pointer taken along line 1—1 shown in FIG. 1. The pointer is made of a light emission element M which is of the inorganic substance dispersion type and shaped as a rod and has a luminously visible portion 51 which has a width smaller than the diameter of the pointer and constitutes a luminous line at the time of emission of light from the element so that the pointer can be accurately read.

The element M includes a metal core 10, an electrically-insulating reflective layer 20 made of an enamel and disposed on the core, a fluorescent light emission layer 30 which is made of an enamel and a fluorescent substance dispersed therein and is disposed on the reflective layer, an intermediate electrically-insulating layer 40 disposed on the light emission layer, an electroconductive film 50 disposed on the latter insulating layer, and an outer electrically-insulating layer 60 disposed on the film, as shown in FIG. 2. The element M also includes an electrode provided on the metal core 10 but not shown in the drawings, and an electrode provided on the film 50 but not shown therein. The electrodes can be connected to a power supply through wires such as enameled wires to cause the element M to emit the light.

The metal core 10 is made of a linear decarburized steel or a linear stainless steel. It is preferable that before the electrically-insulating reflective layer 20 is provided on the core 10, the surface thereof is sandblasted or plated with nickel to improve the adhering property of the surface to the layer.

It is preferable that the enamel of which the electrically-insulating reflective layer 20 is made is high in dielectric constant to increase an electric field to be applied to the fluorescent light emission layer 30 and is white in color to act for reflection.

The fluorescent light emission layer 30 is made of the enamel and the fluorescent substance dispersed therein.

The intermediate electrically-insulating layer 40 is made of a vitreous enamel, and protects the light emission layer 30. The insulating layer 40 may not be provided if the outer electrically-insulating layer 60 protects the element M enough without the former layer.

The electroconductive film 50 does not need to be transparent as the ITO film of the conventional element, but can be an opaque film which is manufactured by applying an electroconductive paste of copper, silver or the like or electric plating with a metal such as nickel, chromium and tin, to diminish the cost of the pointer. Since the film 50 is lower in resistivity than the ITO film, the pointer is higher in reliability.

The outer electrically-insulating layer 60 electrically insulates the element M from the outside, and protects the element. At least the light emission part of the surface of the layer 60 is transparent. The layer 60 is made of a transparent resin, a transparent vitreous enamel or the like. If the layer 60 is made of the enamel or the like, it should be based so that the electroconductive film 50 is not adversely affected. The surface of the layer 60 is painted white so that when the pointer does not emit the light, external light is reflected by the painted surface so that the pointer is visible. However, if the pointer always emits the light so as to be read, the painting may not be performed to reflect the, external light.

In the structure described above, the electroconductive film 50 is formed on the light emission layer 30 and the insulating layer 40. The electroconductive film 50 has a slit which is the luminously visible portion 51 extending in the longitudinal direction of the film and having the width smaller than the diameter of the luminous pointer. The emitted light passes through the slit 51 so that the pointer is visible. Since the width of the slit 51 is smaller than the diameter of the reading pointer, the accuracy is high. The slit 51 is made by forcibly removing a part of a plating film, a part of an electroconductive paste film, or the like. The width of the slit 51 is normally set at 1.0 mm or less, preferably at 0.1 mm to 0.5 mm. The slit may be optionally shaped so that the width thereof decreases from the butt of the pointer toward the tip thereof, or larger at the tip than at the other portion of the pointer as an arrow, for example.

When a voltage is applied from the power supply to the metal core 10 and the electroconductive film 50 through the wires and the electrodes, the electric field is generated in the fluorescent light emission layer 30 so that the fluorescent substance emits the light which is emitted out of the pointer through the slit 51. As a result, the pointer looks as if only the thin longitudinal central portion thereof emits the light. For that reason, the accuracy of the reading of the pointer is heightened.

Figure 3:
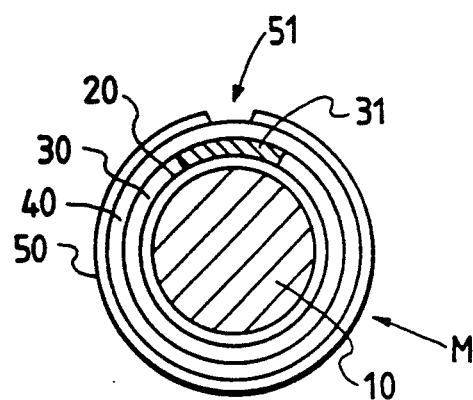
FIG. 3 is a sectional view of a luminous pointer which is another embodiment of the device.

FIG. 3 shows a luminous pointer which is another of the embodiments. The difference of the pointer from the preceding one is that the fluorescent substance of the fluorescent light emission layer 30 of a light emission element M of the inorganic substance dispersion type is dispersed only near the bottom of the slit 51 of the electroconductive film 50 of the element. FIG. 3 does not show the outer electrically-insulating layer 60 of the element M. Since the light emission layer 30 has a fluorescent substance dispersion part 31 only near the slit 51, the amount of the fluorescent substance is smaller than that of the fluorescent substance of the preceding pointer to more diminish the cost of the pointer shown in FIG. 3. Besides, the accuracy of reading of the pointer is as high as that of reading of the preceding one.

Figure 4:
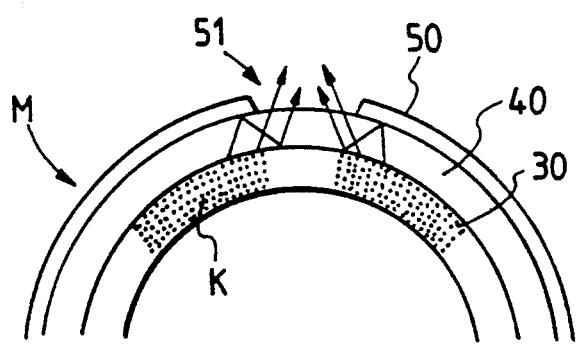
FIG. 4 is an enlarged sectional view of a major part of each of the pointers to illustrate how they emit light.

FIG. 4 is a sectional view to illustrate how each of the luminous pointers emits the light of the embodiments shown in FIGS. 1 and 2. When the light is emitted by the fluorescent substance K of the light emission layer 30 under the influence of the electric field, a part of the light proceeds straight through the slit 51 of the electroconductive film 50 and another part of the light proceeds and is reflected by the film, reflected again by the layer and transmitted through the slit. The portion of the fluorescent substance K, which is located immediately under the slit 51, emits none of the light. The other portions of the substance K, which are located at both the sides of the slit 51, emit a part of the light to make the slit 51 visible to see the pointer. For these reasons, although the dispersed fluorescent substance K of the light emission layer 30 of the pointer shown in FIG. 3 is contained only in the fluorescent substance dispersion part 31 of the layer near the slit 51, the quantity of the emitted light part which contributes to making the slit visible to see the pointer is as large as that of the emitted light part which contributes to the same purpose for the preceding pointer in which the fluorescent substance is dispersed in the entire fluorescent light emission layer 30.

Figure 5:
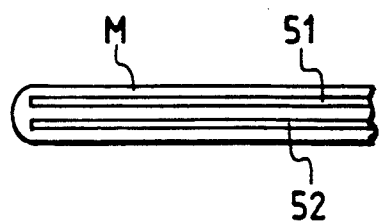
FIG. 5 is a front view of a luminous pointer which is yet another embodiment of the device.

FIG. 5 shows a luminous pointer which is yet another of the embodiments. The difference of the pointer from that shown in FIG. 1 or 3 is that an electroconductive film 50 has two slits 51 and 52 extending in parallel with each other in the longitudinal direction of the pointer to allow emitted light to pass through the slits.

Figure 6:
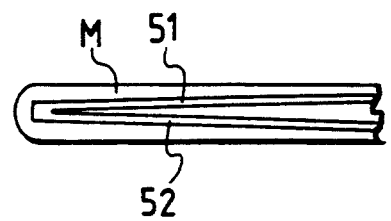
FIG. 6 is a front view of a luminous pointer which is yet another embodiment of the device.
Figure 7:
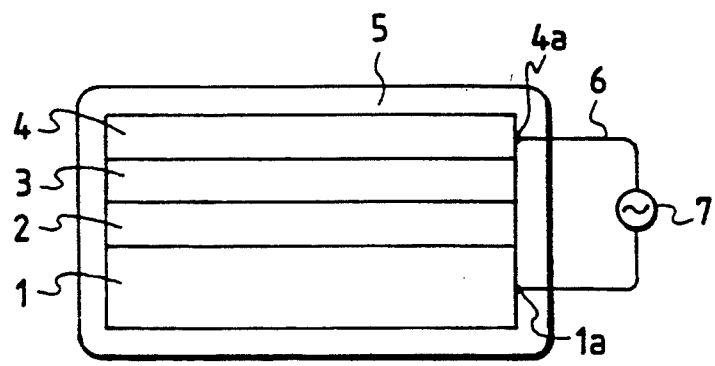
FIG. 7 is a sectional view of a conventional flat light emission element of the inorganic substance dispersion type.

FIG. 6 shows a luminous pointer which is yet another of the embodiments. The difference of the pointer from that shown in FIG. is that an electroconductive film 50 has two slits 51 and 52 extending along the longitudinal direction of the pointer and joining each other at the tip of the pointer as V.

In the case that each of these luminous pointers is provided in the measuring instrument of a motor vehicle, for example, the light is emitted from the pointer through the slit 51 or the slits 51 and 52 at night so as to be visible to make it possible to see the pointer to read it, and no light is emitted by the pointer but external light is reflected by the pointer in the daytime so as to be visible to make it possible to see the pointer to read it. The pointers can thus be conveniently used. In the case that each of the pointers is provided in another type of measuring instrument, the light is always emitted from the pointer through the slit 51 or the slits 51 and 52 so as to be visible to make it possible to see the pointer to accurately read it all the time.

A luminous pointer provided in accordance with the present device is made of a light emission element which is of the inorganic substance dispersion type and has an electroconductive film in which a slit is provided so that it extends in the longitudinal direction of the film and the width of the slit is smaller than the diameter of the pointer. Light is emitted from the pointer through the slit so as to be visible to make it possible to see the pointer to accurately read it. Since the electroconductive film is not an expensive ITO film but is manufactured by applying an electroconductive paste or plating with a metal, the pointer is lower in cost. Since the pointer is high in accuracy of reading and lower in cost, it can be widely used for the measuring instrument of a motor vehicle, another type of measuring instrument or the like.

What is claimed is:

1. A luminous pointer comprising:
    liner metal core;
    an electrically insulating reflective layer disposed on said liner metal core, said electrically insulating reflective layer being made of enamel;
    a fluorescent light emission layer formed on at least a portion of said electrically insulating reflective layer;
    an opaque electroconductive film provided around said fluorescent light emission layer, said electroconductive film having at least one slit portion which has a width smaller than a diameter of said luminous pointer, said electroconductive film and said liner metal core being electrically connected to a power source; and
    an outer electrically insulating layer having a transparent light emission portion, is formed on said electroconductive film, wherein when voltage is applied by the power source to said electroconductive film and said metal core light is emitted by said light emission layer and passes through said at least one slit portion and said light emission portion.

2. A luminous pointer as claimed in claim 1, wherein said electroconductive film is made of one of an electroconductive paste and a plated metal.

3. A luminous pointer as claimed in claim 1, wherein said fluorescent light emission layer is made of enamel and a fluorescent substance which is located near said at least one slit portion of said electroconductive film.

4. A luminous pointer as claimed in claim 2, wherein said fluorescent light emission layer is made of enamel and a fluorescent substance which is located near said at least one slit portion of said electroconductive film.

5. A luminous pointer as claimed in claim 1 further comprising:
    an intermediate electrically insulating layer provided between said fluorescent light emission layer and said electroconductive film, said intermediate electrically insulating layer being made of enamel.

6. A luminous pointer as claimed in claim 5, wherein said electroconductive film is made of one of an electroconductive paste and a plated metal.

7. A luminous pointer as claimed in claim 5, wherein said fluorescent light emission layer is made of enamel and a fluorescent substance which is located near said at least one slit portion of said electroconductive film.

8. A luminous pointer as claimed in claim 6, wherein said fluorescent light emission layer is made of enamel and a fluorescent substance which is located near said at least on slit portion of said electroconductive film.

* * * * *